United States Patent [19]
Kim et al.

[11] Patent Number: 5,375,483
[45] Date of Patent: Dec. 27, 1994

[54] DIRECTIONAL CONTROL VALVE OF A HYDRAULIC CONTROL SYSTEM FOR AUTOMATIC TRANSMISSION

[75] Inventors: Youngbae Kim, Yongin-kun; Jaedeog Jang, Seoul, both of Rep. of Korea

[73] Assignee: Hyundai Motor Company, Seoul, Rep. of Korea

[21] Appl. No.: 989,522

[22] Filed: Dec. 11, 1992

[30] Foreign Application Priority Data

Dec. 30, 1991 [KR] Rep. of Korea ............... 91-25204

[51] Int. Cl.$^5$ ............................................. F16H 47/00
[52] U.S. Cl. .................................. 74/730.1; 475/120
[58] Field of Search ............... 475/120, 123; 74/730.1, 74/732.1, 867

[56] References Cited

U.S. PATENT DOCUMENTS

| | | | |
|---|---|---|---|
| 3,667,322 | 6/1972 | Noguchi et al. | 475/120 X |
| 4,506,563 | 3/1985 | Hiramatsu | 74/867 |
| 4,519,273 | 5/1985 | Shimizu et al. | 74/867 X |
| 4,942,787 | 7/1990 | Aoki et al. | 74/867 |
| 5,003,842 | 4/1991 | Hatta et al. | 74/867 |
| 5,115,696 | 5/1992 | Takada et al. | 74/867 X |
| 5,154,099 | 10/1992 | Asatsuke et al. | 74/867 |

*Primary Examiner*—Rodney H. Bonck
*Attorney, Agent, or Firm*—Birch, Stewart, Kolasch & Birch

[57] ABSTRACT

A directional control valve of a hydraulic pressure control system for an automatic transmission includes a housing, a valve spool, and a compression spring, whereby the housing has five ports. This directional control valve operates such that during the second-third up-shift the pressure of a front clutch and a servo brake release pushes the valve spool in FIG. 1 to the left side so that the port for oil supply to the end clutch opens. Accordingly, the hydraulic pressure is supplied to the end clutch as well as to the sensing chamber in the right side so that even when the oil pressure of the front clutch and servo brake is released, the pressure in the sensing chamber overcomes the elastic force of compression spring and pushes the valve spool to the left side continuously in the fourth speed range.

5 Claims, 3 Drawing Sheets

DIRECTIONAL CONTROL VALVE OF A HYDRAULIC CONTROL SYSTEM FOR AUTOMATIC TRANSMISSION

BACKGROUND OF THE INVENTION

1. Field of The Invention

The present invention relates to a directional control valve, so called end clutch of a hydraulic control system, for an automatic transmission vehicle and more particularly to a control means for a directional control valve with a simple construction, which can improve the performance of an automatic shift control.

2. Description of the Related Art

A conventional automatic transmission for a vehicle has a torque converter and a multiple stage transmission gear mechanism connected with the torque converter, which hydraulically actuates friction members for selecting one of the gear stages of the transmission gear mechanism in accordance with vehicle operating conditions.

A hydraulic control system pressurized by an oil pump provides working pressure required to operate the friction members and control valves.

The commonly used automatic transmission for a vehicle has a fluid torque converter which generally includes a pump impeller connected with an engine output shaft to be driven thereby, a turbine runner with an output shaft member, and a stator disposed between the pump impeller and the turbine runner, so that hydraulic fluid is circulated by the engine-driven pump impeller through the turbine runner with the aid of the stator which functions to deflect the hydraulic fluid from the turbine runner to a direction where fluid flow does not disturb a rotation of the pump impeller when fluid flows into the pump impeller.

The automatic shift is made by the operation of friction members such as clutches or a kick-down brake at each shift change. Also, a manual valve whose port is converted by selecting a position of a selector lever, is designed to be supplied with oil from and to supply the oil to a shift control valve. In a 4-speed automatic transmission, the shift control valve has an opening port made by an electronic control system.

One example of a hydraulic pressure control system of an automatic transmission for vehicles will be described in FIG. 3 which shown a circuit diagram of a conventional hydraulic control system comprising a torque converter 1 attached to an engine through the engine flexplate, and rotating at the engine speed for transmitting power of the engine to the input shaft of the transmission gear mechanism, a damper clutch control valve 2 for controlling the application and release of a damper clutch to increase the power train efficiency inside the torque converter 1, a regulator valve 5 for regulating an output oil pressure of the oil pump 4 according to the automatic transmission requirements, and a reducing valve 6 for stably regulating the oil pressure supply to a solenoid valve and the damper clutch control valve 2.

A manual valve 7, which is connected with an outlet of the oil pump 4 and is provided with the hydraulic pressure, is designed to deliver line pressure to the regulator valve 5 and a shift control valve 8. In the manual valve 7, lands are changed according to the position of a shift selector lever.

The shift control valve 8, which is operated in response to two shift control solenoid valves P and Q controlled by TCU, is designed to transmit the oil pressure selectively through a first-second speed shift valve 9, an end clutch valve 10, a second-third and a third-fourth speed shift valve 11, and a rear clutch exhaust valve 12 to a front clutch 13, a rear clutch 14, a low and reverse brake 15, a kick down servo brake 16, the end clutch 17, and the like.

An N-D control valve 18 is connected to the rear clutch 14. An N-R control valve 19 is connected to the first-second speed shift valve so as to reduce an impact caused by the shift.

Also, a pressure control solenoid valve 20 is connected to a pressure control valve 21 to reduce a shock produced by the control at the time of shifting.

The 4-speed automatic transmission described above uses the end clutch valve 10 to deliver the power of the input shaft to a carrier of a planetary gear unit in the fourth speed.

FIG. 4 shown a sectional side view of an end clutch valve 10, where a valve spool V has lands L1 and L2 movable in a housing H to selected positions.

A plug PL is located in the right of a valve spool V, and a spring S is mounted elastically between the valve spool and the plug.

In the housing H, a port P1 is connected to a second speed hydraulic pressure line SCV2 of the shift control valve 8, the port P2 is connected to a third speed hydraulic pressure line SCV3, and a port P3 is connected to a fourth speed hydraulic pressure line SCV4.

Also, the port P4 for providing the hydraulic pressure into the end clutch 10 is placed in the housing H. A port P5 operates in the direction of a release of a front clutch 13 and a kick down band brake 16, and is connected to a hydraulic line.

In the first-second speed shift, the end clutch valve 10 explained above becomes ready to make a third speed shift by the valve spool V moved to the right by the second speed hydraulic pressure supplied into the housing H through the port P1.

In the second-third speed shift, the exhausted hydraulic pressure of the front clutch and the kick down band brake 16 is supplied to the inside of the plug PL through the port P5.

At this time, the port P2 is opened by the valve spool moved in the left direction when the sum of the elastic force of a spring S and the hydraulic force operating to the land L2 is larger than the hydraulic force operating at the left of the land L1. Accordingly, the hydraulic pressure supplied through the port P2 is delivered to the end clutch 17 through the port P4.

In the third-fourth speed shift the exhausted hydraulic pressure of the front clutch 13 and the kick down band brake 16 is released, but the end clutch continues operating because the position of a valve spool V becomes the same as the third speed shift by the plug PL moved to the left by the hydraulic pressure being operated to a chamber A.

In the fourth-third speed down-shift, the plug PL is moved to the right by the hydraulic pressure operating through a port P5.

In the third-second speed down-shift the valve spool V is moved to the left by releasing the hydraulic pressure operating through the port P5, and the operating pressure on the end clutch 17 is exhausted quickly through a check ball.

In the second-first speed down-shift, the valve spool V is moved to the left by the elastic force of the spring S, because the hydraulic pressure supplied through the port P1 is drained.

Since the end clutch valve explained above is prepared to make the shift to the third speed by moving the valve spool V by the hydraulic pressure in the second speed, there can occur some problems like the following. The hydraulic pressure operates toward the end clutch, the hydraulic pressure being operated to the other side of the valve spool while the hydraulic pressure operates to one side of the valve spool in the second-third speed shift, and at this time, if the hydraulic pressure line is out of order, a tie-up phenomenon takes place due to sudden movement of the valve.

In addition, it is necessary to use a plug, so that the device is complicated in structure, and is increased in production cost.

SUMMARY OF THE INVENTION

Therefore, it is an object of the present invention to provide a directional control valve of a hydraulic pressure control system for an automatic transmission which is simple in construction, makes a smooth and reliable shift, and can solve the disadvantages of the above-discussed hydraulic pressure control system for the automatic transmission.

To accomplish these objects, the present invention provides a directional control valve of a hydraulic pressure control system for an automatic transmission comprising a housing and a spool, wherein the housing has various ports such as a third-speed supply hydraulic pressure port, a fourth-speed hydraulic pressure port, exhaust ports of a front clutch and a kick down band brake, and an end clutch operating a pressure port. A spool which is in the housing has each land with its different area, and is elastically biased with a spring.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENT

Figure 1:
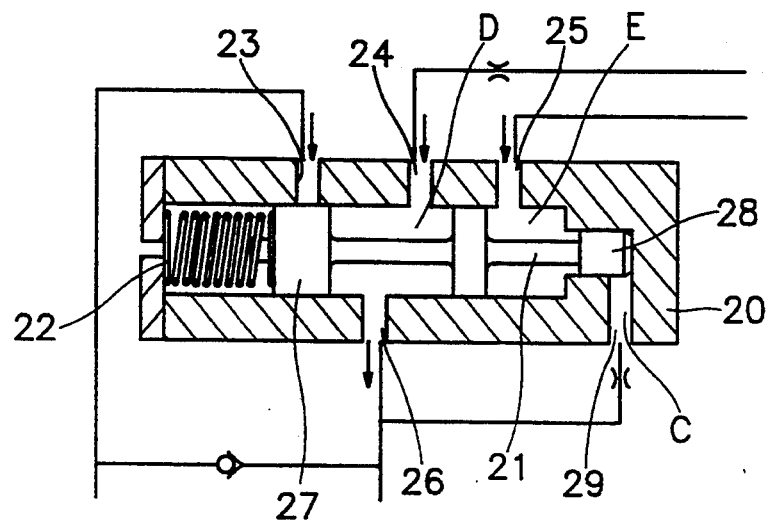
FIG. 1 is a sectional-side view of a directional control valve according to the present invention.
Figure 4:
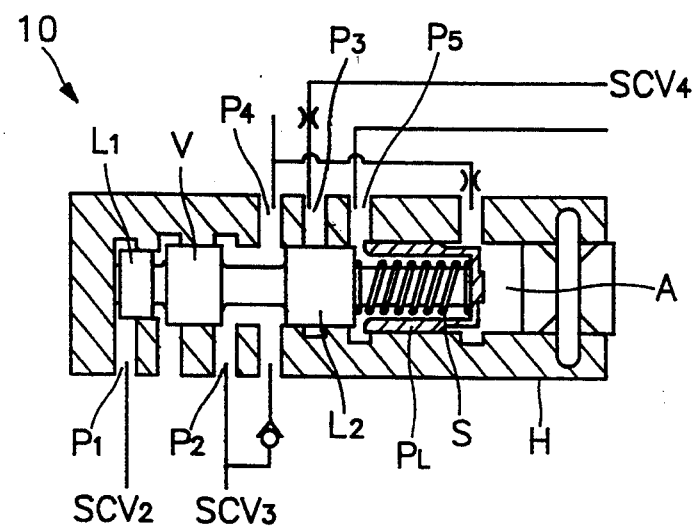
FIG. 4 is a sectional-side view illustrating a conventional directional control valve.

FIG. 1 is a sectional-side view of a directional control valve according to the present invention. A valve spool 21 is elastically supported by a spring 22 inside a valve housing 20.

In the valve housing 20, third-speed hydraulic pressure is supplied from a shift control valve 8 and flows into a port 23; fourth-speed hydraulic pressure is supplied to a port 24 which is next to the port 23; and released hydraulic pressure of a front clutch 13 and a kick down band brake 16 is provided to a port 25 which is next to the port 24.

Also, a port 26 for supplying the hydraulic pressure to an end clutch 17 is provided in the housing, and two lands 27, 28 with different areas are placed at opposing ends of the valve spool 21.

In a region where the land 28 is positioned, another port 29 is opened and is designed to supply the hydraulic pressure to a chamber C.

Figure 2:
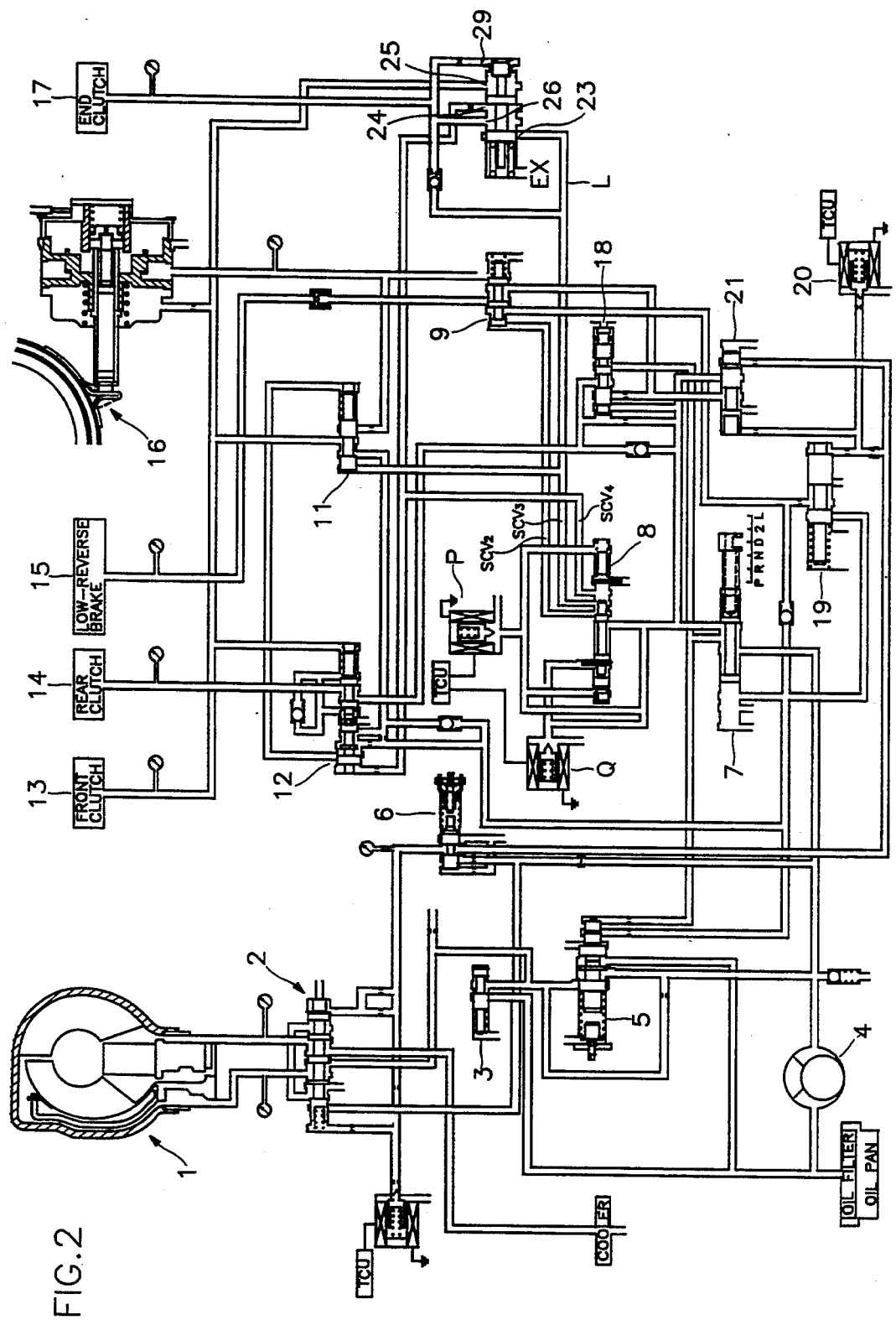
FIG. 2 is a hydraulic circuit diagram showing a directional control valve therein according to the present invention.
Figure 3:
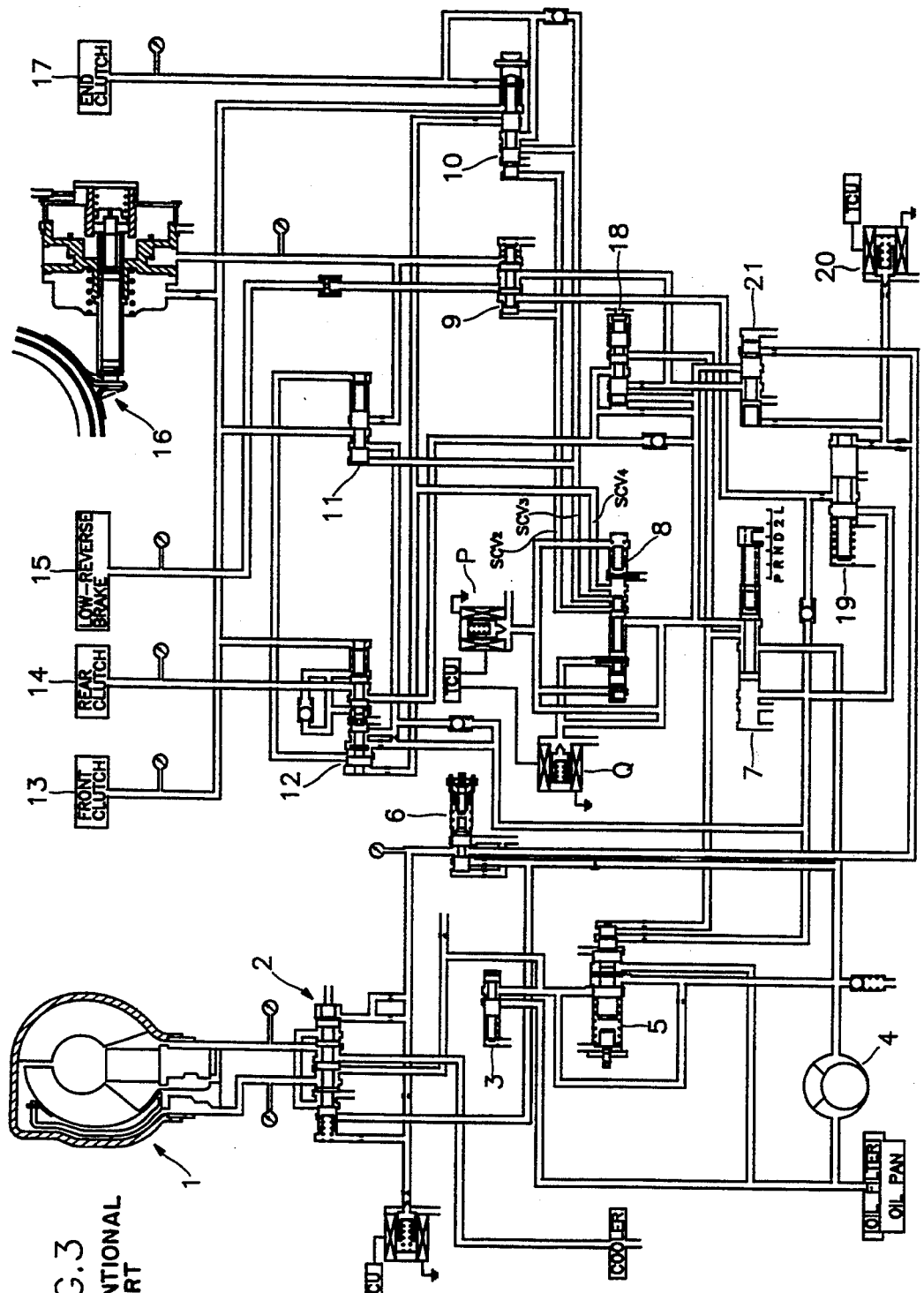
FIG. 3 is a hydraulic circuit diagram showing a conventional 4-speed automatic transmission.

FIG. 2 illustrates how the directional control valve of the present invention is connected with a shift control valve 8, the end clutch 17, kick down servo brake 16, and the front clutch 13.

The third-speed control pressure line SCV3 of the shift control valve 8 is connected to the port 23, and is designed to provide the hydraulic pressure A.

In the directional control valve of the present invention, during a first-second up-shift and a second-first down-shift, the valve spool 21 is moved to the right by an elastic force of the spring 22 so as to block the port 23 with land 27.

The released hydraulic pressure from the front clutch 13 and the kick down band brake 16 is supplied to a chamber E through the port 25. At this time, when the hydraulic pressure supplied becomes higher than the elastic force of the spring 22, the valve spool 21 is moved to the left, so that the third-speed control pressure is provided to the port 26 from the port 23 via the chamber D, and this pressure is supplied to the chamber C.

When this hydraulic pressure is higher than the elastic force of the spring 22, the valve spool 21 is moved to the left, so that the valve spool closes the port 24.

In the third-fourth up-shift, the spool 21 is moved to the left by back hydraulic pressure supplied to the chamber C so that the hydraulic pressure supplied to the port 25 is released to an exit port of the manual valve 7 through a third-fourth speed shift valve 11.

At this time, when the valve spool 21 is not fixed to the left inside the housing, a safe circuit is made because the hydraulic pressure is provided to the port 26 from the port 24 through the chamber D.

In the fourth-third down-shift, the hydraulic pressure is supplied through the port 25.

In the third-second down-shift, the hydraulic pressure supplied through the port 26 to the end clutch 17 is rapidly exhausted through a check ball, and also the hydraulic pressure provided through the port 25 and provided to the chamber C is exhausted, so that the valve spool 21 is moved to the right by the elastic force of the spring 22, and so, closes the port 23.

The directional control valve of the present invention as explained above has a simple construction, since it does not use a plug. While the prior art valve is moved by the hydraulic pressure in the second speed, the present valve is moved by the elastic force of the spring 22, so that the invention can more exactly control an operating time.

Also, the present invention can prevent a tie-up phenomenon in the second-third shift, because the spring supports the valve elastically in the one side of the valve, while in the conventional valve, the hydraulic pressure is supplied to the end clutch by the operation of the hydraulic pressure exerted on both sides of the valve.

In addition, in the fourth speed, if the hydraulic pressure is not provided to the end clutch by a valve stick, the fourth-speed control hydraulic pressure is directly supplied to the end clutch, so that the safety circuit is completed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A directional control valve of a hydraulic pressure control system for an automatic transmission, said directional control valve comprising:
    a housing including
        a third speed pressure port connected to a third speed control unit of a shift control valve for detecting a first, second, third, and fourth speed control pressure by two shift control solenoid valves controlled and selectively operated by a transmission control unit, said third speed control unit being connected to an end clutch;
        a fourth speed pressure port connected to a fourth speed pressure line;
        a front clutch port connected to a front clutch exhaust valve and a kick down band servo brake;
        an end clutch port connected to a rear clutch exhaust valve for exhausting a rear clutch operation pressure in case of up-shifting from third speed to fourth speed;
        a back pressure port connected to the end clutch port; and
        a valve spool for selectively opening said ports by being elastically supported by a spring in said valve housing, said valve spool being moved to the right and left by a supply of said third-speed control pressure and the fourth-speed control pressure, wherein said valve spool has a larger land positioned at said third and fourth pressure speed ports and a smaller land positioned adjacent said back pressure port of said end clutch wherein supply of pressure to said larger and smaller lands relative to a strength of said spring causes shifting of said valve spool.

2. The directional control valve as claimed in claim 1, wherein the larger land of said valve spool blocks said third-speed pressure by a normal biasing of the spring in the case of a first-second up-shift and a second-first down-shift.

3. The directional control valve as claimed in claim 1, wherein supply of hydraulic pressure to one side of the larger land of said valve spool opens said third-speed pressure port by countering a normal bias of the spring in the case of a second-third up-shift.

4. The directional control valve as claimed in claim 1, wherein said back pressure port is opened in a third-speed by supplying back pressure thereto and against one side of the smaller land in the case of a third-fourth shift.

5. A hydraulic control system for an automatic transmission having a plurality of clutches and brakes corresponding to forward and reverse speeds with the hydraulic pressure generated from a fluid pump and selectively transmitting a rotating power of a torque converter to each gear element, the combination of said system comprising:
    a fluid pump;
    a manual valve shiftable by a shift lever and which delivers the hydraulic pressure to each valve;
    a solenoid linear valve which is connected to said manual valve and controlled by a transmission control unit so as to proportionally control hydraulic pressure supply within said system;
    an N-D valve and an N-R valve for reducing a shift impact which occurs when said manual valve is shifted from an "N" range to a "D" or "R" range as the hydraulic pressure is selectively applied to said N-D control valve and N-R control valve, respectively, via said manual valve and linear solenoid valve;
    a shift control valve which selectively delivers the hydraulic pressure applied from said manual valve to the valves by the operation of two shift control solenoid valves controlled by a transmission control unit according to vehicle speed; and
    an end clutch valve for controlling a duration of supply the hydraulic pressure to an end clutch, said end clutch valve including;
    a valve housing,
    a valve spool elastically supported by a spring in said valve housing, said valve spool having a large land at one end thereof and a smaller land at an opposing end thereof,
    a third speed pressure port formed in said housing and connected to a third-speed control pressure line,
    a fourth speed pressure port formed in said housing and connected to a fourth-speed control pressure line,
    a front clutch port formed in said housing for receiving hydraulic pressure exhausted from a front clutch and a kick down servo brake,
    an end clutch port formed in said housing for supplying a third-speed hydraulic pressure or fourth-speed hydraulic pressure to the end clutch, and
    a back pressure port formed in said housing for supplying the third-speed hydraulic pressure by operating back pressure against an end of said valve spool having the smaller land,
    said valve spool being moved by the hydraulic pressure which is supplied against the lands via the ports and relative to a biasing strength of the spring.

* * * * *

UNITED STATES PATENT AND TRADEMARK OFFICE
CERTIFICATE OF CORRECTION

PATENT NO. : 5,375,483
DATED : Dec. 27, 1994
INVENTOR(S) : Youngbae Kim, Jaeduk Jang It is certified that error appears in the above-indentified patent and that said Letters Patent is hereby corrected as shown below:

On title page, under the heading [75] Inventors:

please change "Jaedeog Jang" to

--Jaeduk Jang--

Signed and Sealed this

Eighth Day of October, 1996

Attest:

*Attesting Officer*

BRUCE LEHMAN

*Commissioner of Patents and Trademarks*